May 19, 1970     A. H. WILLINGER     3,512,503

COMPARTMENTED FISH DISPLAY CASE

Filed Aug. 16, 1968

*INVENTOR.*
ALLAN H. WILLINGER
BY

United States Patent Office

3,512,503
Patented May 19, 1970

---

3,512,503
COMPARTMENTED FISH DISPLAY CASE
Allan H. Willinger, New Rochelle, N.Y., assignor, by mesne assignments, to Mattel-Aquarium, Inc., Hawthorne, Calif., a corporation of Delaware
Filed Aug. 16, 1968, Ser. No. 753,106
Int. Cl. A01k 63/00
U.S. Cl. 119—5      4 Claims

ABSTRACT OF THE DISCLOSURE

A compartmented display case for separately maintaining and showing fish, as for example "Siamese fighting fish," within an aquarium tank therefor, and comprising an elongated transparent housing provided with at least one open side facilitating the mounting of one transparent divider within the same and wherein the tank wall serves as a closure for this opening in the mounted position of the display case within the tank.

BACKGROUND OF THE INVENTION

Field of the invention

This invention relates generally to aquarium accessories and, more particularly, to means for separately maintaining and displaying fish within a community aquarium.

Description of the prior art

It is often necessary for the aquarium hobbyist to maintain separate environments for fish, due for example to the antagonism of a species such as so-called "Siamese fighting fish," or for breeding purposes, or possibly even just for study purposes. Whatever the reason, while the segregated fish can be satisfactorily maintained either in individual jars or even in separate aquaria, this is aesthetically unattractive and unsatisfactory to the hobbyist, since visual appeal is one of the prime enjoyments of the hobby, and it obviously detracts from the enjoyment of the fish since they are not seen together. There is therefore a need for an aesthetically acceptable, convenient auxiliary display for a community aquarium in which selected fish can be segregated for desired intervals.

SUMMARY OF THE INVENTION

It is, therefore, among one of the principal objectives of the invention to provide a means for enjoying segregated fish within a community aquarium.

In accordance with the present invention there is provided a compartmented display case for separately maintaining and showing fish within an aquarium tank therefor, and comprising an elongated transparent housing provided with at least one transparent divider demountably mounted therein, said housing also being provided with a removable cover for access into the interior thereof. Alternatively, and preferably, a plurality of dividers are provided so that a plurality of compartments are formed for individually maintaining and showing a number of fish.

BRIEF DESCRIPTION OF THE DRAWING

The invention will hereinafter more fully be described with reference to the accompanying drawing, in which.

DESCRIPTION OF THE PREFERRED EMBODIMENTS

Reference is now made to the drawings wherein there is shown an aquarium tank 10 of conventional construction, having mounted on one glass wall 12 thereof, and within its interior, a compartmented display case 14 demonstrating objects and advantages of the present invention.

Figure 1:
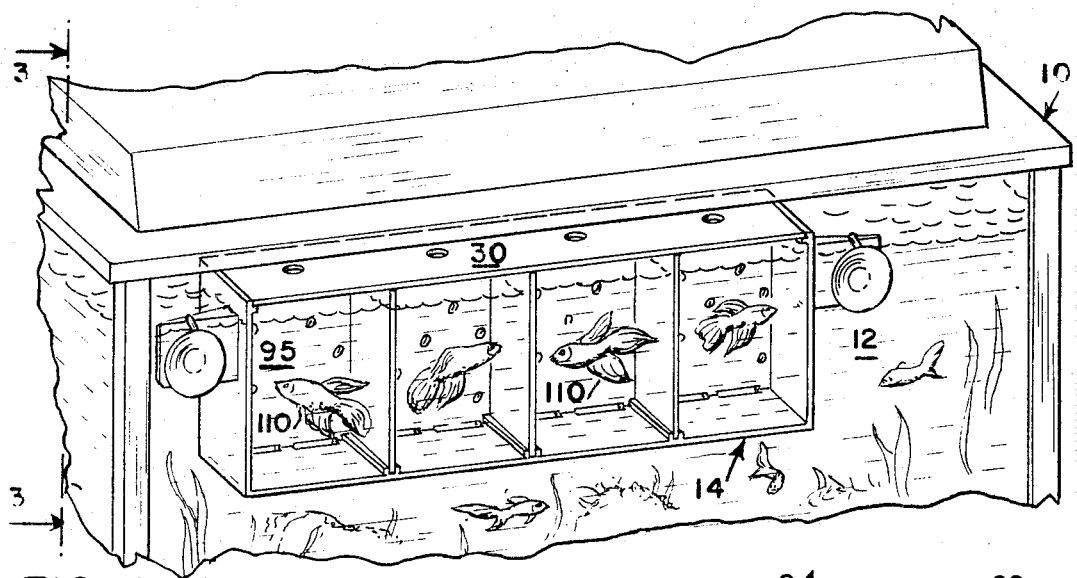
FIG. 1 is a fragmented perspective view showing a compartmented display case according to the present invention mounted inside an aquarium tank on one of the walls thereof.
Figure 2:
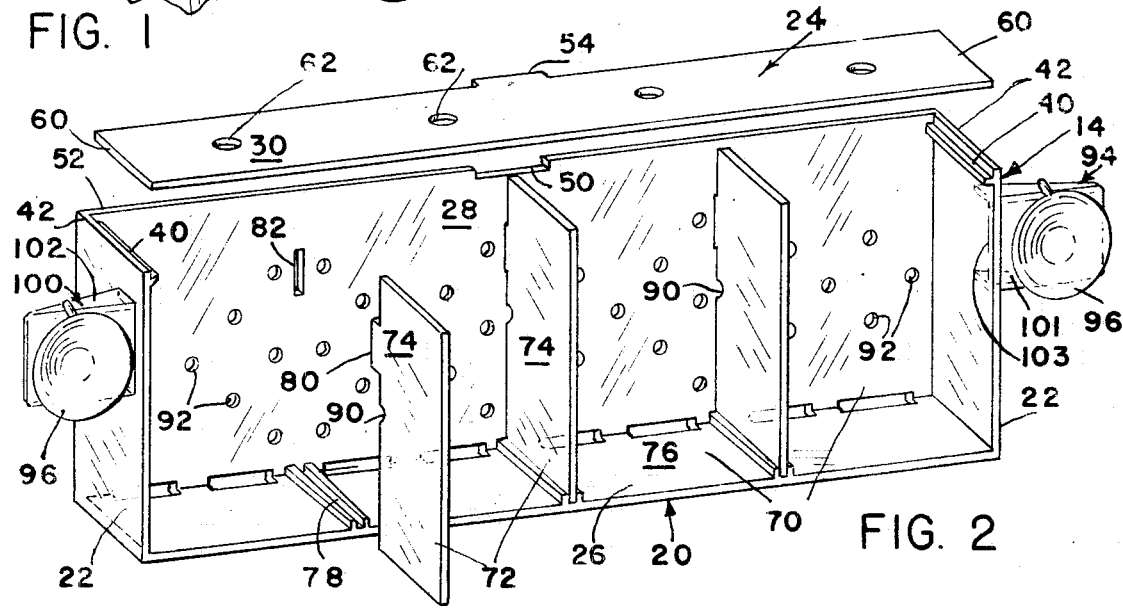
FIG. 2 is an exploded view in perspective of the display case.

Compartmented display case 14 (FIG. 2) comprises a generally elongated, rectangular shaped housing 20, made of a suitable transparent plastic material, such as Lucite, or the like. Housing 20 further comprises a pair of parallel opposing end walls 22, a top cover 24 and bottom wall 26. A rear wall 28 integrally connects the end walls 22 and bottom wall 26, the whole being preferably molded as a single plastic unit. It will be apparent that when top cover 24 is in place, the inner surface 30 thereof serving as a ceiling, the housing 20 forms a generally, rectangular shaped structure having a front side opening opposite the rear wall 28.

Top cover 24, at its ends 60, seats on a pair of parallel, opposing transversely running flanges 40 provided below the top edge 42 of end walls 22 an appropriate distance that the top cover 24, in its closed position, will be in the plane of the end wall top edges 42. A rectangular, centrally located slot 50 in the upper longitudinal edge 52 of rear wall 28 cooperates with an appropriately shaped rectangular key 54 on the longitudinal edge of cover 24 to lock the cover 24 in place when it is seated on the flanges 40. The depth of slot 50 is also of an appropriate extent that the cover will be in the plane of the rear wall upper longitudinal edge 52. Air holes 62 promote ventilation through the cover.

Housing 20 is sectioned off into compartments 70 by means of dividers 72 which completely isolate one compartment from the other so that fish contained in the compartments can be segregated. As here shown, there are four compartments, but this may be varied as desired, being a function of, for example, the number of "fighting fish" to be displayed and housed, as well as the length of the aquarium in which the display case 14 is contained. Dividers 72 are made of the same suitable transparent plastic material described earlier for the housing.

Each divider 72 consists of a generally rectangular flat plastic plate 74. At a predetermined interval, depending on the number of compartments desired, on the inside surface 76 of bottom wall 26 is integrally provided a U-shaped channel-way 78, running in a transverse direction. The channel-way 78 is of such width as to slidingly accommodate divider plate 74 in fairly snug, but not necessarily tight fashion. Another rectangular key 80 is integrally provided along a longitudinal edge of rectangular divider plate 72, about two-thirds of the way up. Key 80 is received inside a rectangular slot 82 (similar to a coin slot) provided on rear wall 28, directly on a line with channel-way 78. Thus, when divider 72 is to be demountably mounted into the housing all that need be done is to slide divider plate 74 from a direction through the open front side and transversely along channel-way 78 until key 80 fits into slot 82 to lock the divider in place. The size of each rectangular divider plate 74 is such as to avoid contact with the cover 24. Additionally, the width of plate 74 is such that when it is locked in place, its outermost edge will be in smooth relation with the outermost edge of the housing, i.e. the front open side. Semi-circular slots 90 in each divider plate 74 just below the key member 80 promote water circulation throughout the several compartments. This same objective is achieved by a multiplicity of holes 92 randomly provided along and through the rear wall 28.

Figure 3:
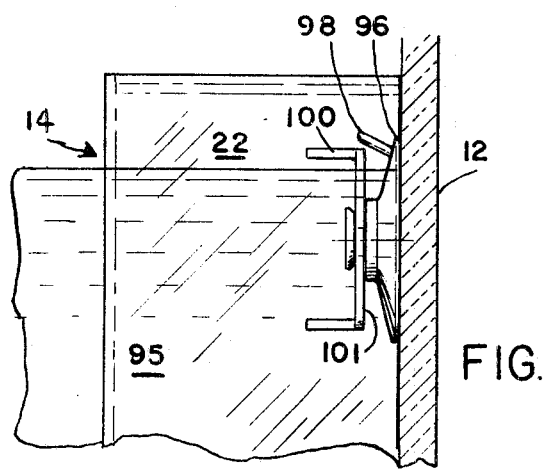
FIG. 3. is a fragmented, partially sectioned end view taken along line 3—3 of FIG. 1.

On each end wall 22, lying substantially in the plane of the case open side, there is a mounting member 94 (FIGS. 2, 3) oriented in an outwardly facing relation from the open end of housing 20. Mounting member 94 consists of a plastic suction cup 96 provided with a grip 98, which cup is rotatingly mounted in a plastic support bracket 100 therefor. Bracket 100 consists of a rectangular flat plate 101 whose opposing longitudinal edges each integrally merge into right triangular base portions 102, with the base of each right triangle being joined to the end wall 22, and also to one opposing transverse edge 103 of the rectangular flat plate. Suction cup 96 is mounted on rectangular flat plate 101 in the direction of the open end of the housing 20 and protrudes outwardly therefrom, so that the suction cup will be the leading contact surface of the entire display case.

Using Bettas or "Siamese fighting fish" as an example, when segregating these in a community aquarium 10, the display case 14 is mounted on a wall 12 of the aquarium by means of the suction cups 96 provided on mounting members 94, at the level at which water 95 circulates through and almost fills each compartment 70. In this mounted position, the portion of the wall 12 coextensive with the side opening serves as a closure for the side opening. Bettas can live in a confined space since they breathe air at the surface of the water, and thus it is desirable to have an air space left under the removable ceiling 30 and also to have the previously noted air hole 62.

The cover 24 is removed to facilitate the placement of individual Betta 110 into each compartment 70, safely segregated from each other, yet aesthetically displayed in a total aquarium environment.

A latitude of modification, change and substitution is intended in the foregoing disclosure and in some instances some features of the invntion will be employed without a corresponding use of other features. Accordingly, it is appropriate that the appended claims be construed broadly and in a manner consistent with the spirit and scope of the invention herein.

What is claimed is:

1. The combination of an aquarium tank having a front wall and a fully enclosed auxiliarry compartmented display case mountable within said tank, said display case comprising a pair of end walls, a rear wall and a bottom wall operatively arranged to define an internal volume, an adjacent upper opening and front side opening into said internal volume bounded by the unattached edges of said end and bottom walls, at least one divider wall positionable through said adjacent openings into engaging contact with said rear and bottom walls so as to deliberate said internal volume into compartments, suction cup means supported on said container substantially in the plane of said front side opening having an operatively outwardly facing orientation, said display case having an operative mounted position within said tank with said suction cup means engaged with said tank front wall and the portion of said tank front wall coextensive with said front side opening serving as a closure for said front side opening, and a cover member positionable in said upper opening to thereby complete the enclosing of said display case.

2. A display case as defined in claim 1 wherein said suction cup means includes two suction cups, each mounted in a lateral clearance position from an end wall.

3. A display case as defined in claim 1 including as cooperating engaging structure on said divided wall and on said bottom wall means defining a groove of an appropriate extent to accommodate an edge of said divider wall.

4. A display case as defined in claim 3 including plural divider walls and a cooperative groove for each said wall operatively arranged at spaced intervals along said bottom wall within said internal volume.

References Cited

UNITED STATES PATENTS

| | | | |
|---|---|---|---|
| 3,140,691 | 7/1964 | Stark | 119—5 |
| 3,288,110 | 11/1966 | Foldman et al. | 119—5 |
| 3,291,098 | 12/1966 | Halpert | 119—5 |

ALDRICH P. MEDBERY, Primary Examiner